July 31, 1945.  R. E. BRIGGS  2,380,384
CONVEYER
Filed Nov. 18, 1944
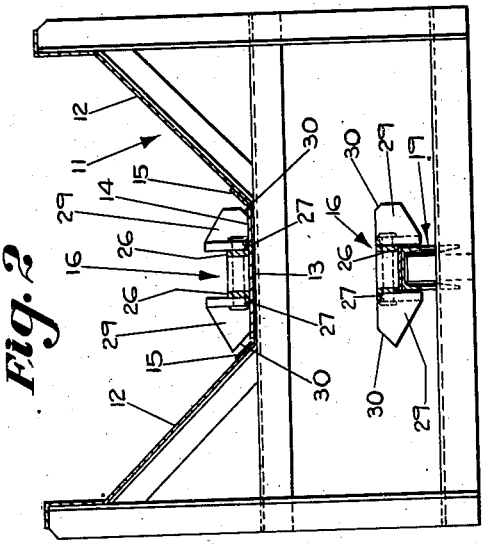
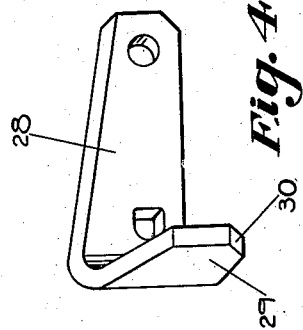
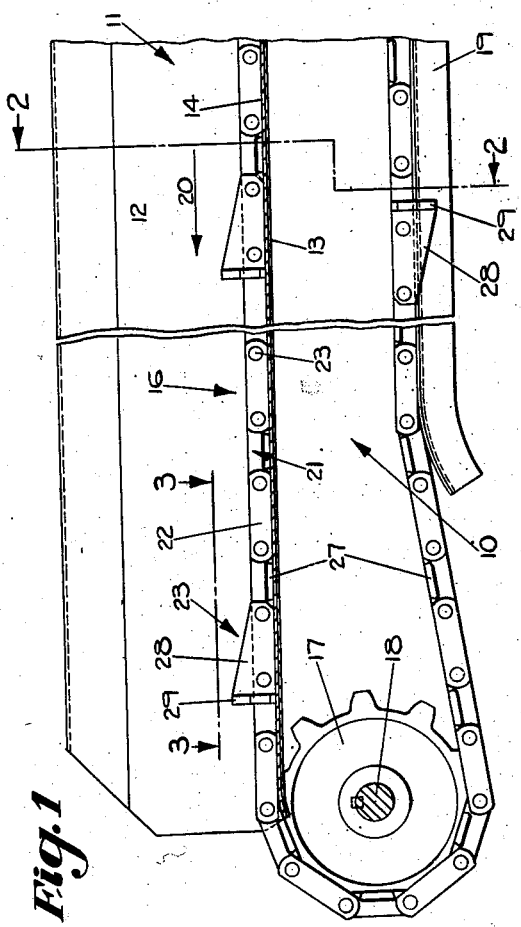
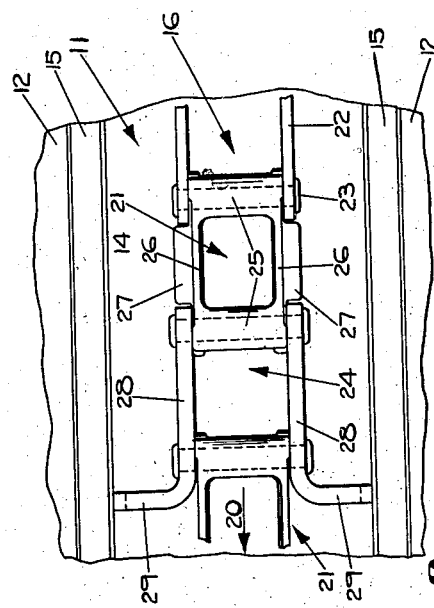
INVENTOR;
ROBERT E. BRIGGS,
BY
ATT'Y.

Patented July 31, 1945

2,380,384

UNITED STATES PATENT OFFICE 2,380,384

CONVEYER

Robert E. Briggs, Columbus, Ohio, assignor to The Jeffrey Manufacturing Company, a corporation of Ohio Application November 18, 1944, Serial No. 564,055

2 Claims. (Cl. 198—171)

This invention relates to a conveyer particularly adapted to convey logs and like material.

An object of the invention is to provide an improved conveyer construction in which the wear on the conveyer parts is reduced to a minimum.

A further object of the invention is to provide an endless chain and flight construction for an improved scraper type conveyer particularly adapted to convey logs along a trough.

Other objects of the invention will appear hereinafter, the novel features and combinations being set forth in the appended claims.

In the accompanying drawing,

Fig. 1 is a longitudinal sectional elevational view showing the head or discharge end of the conveyer incorporating the features of my invention;

Fig. 2 is a transverse sectional elevational view taken on the line 2—2 of Fig. 1, looking in the direction of the arrows;

Fig. 3 is an enlarged plan view, showing the chain and flight conveyer mechanism and taken on the line 3—3 of Fig. 1, looking in the direction of the arrows; and Fig. 4 is a perspective view of one of the integrally formed side bars and flights of the conveyer chain and flight mechanism.

The conveyer mechanism herein disclosed is an improvement over that disclosed in my Patent 2,286,666 for a Conveyer, dated June 16, 1942. It is to be understood that unless a contrary fact is indicated, the structure herein disclosed follows that of said patent.

In the operation of the conveyer mechanism disclosed in my Patent 2,286,666 above identified, it has been found that under certain circumstances the width of the trough was inadequate for very large logs and in some instances the logs would lie in the trough, and the conveyer chain with its flights would pass under the logs, without conveying them along the trough. As a consequence it is desirable to provide a trough of greater width and at the same time provide mechanism in connection with the conveyer chain which has a double function of guiding the conveyer chain so as to maintain it substantially along the center of the trough bottom, while at the same time to insure that any logs in the trough will be conveyed therealong by the traveling chain and flight conveyer mechanism.

In addition, it is desired to maintain a maximum wearing or bearing surface on the chain and flights, both in their travel over the trough bottom and during their return travel. The structure of the mechanism herein disclosed accomplishes these desirable results.

The conveyer herein disclosed includes a supporting frame 10 made up of a trough 11 formed by side walls 12, 12, at least a portion of which side walls slopes downwardly and inwardly to a trough bottom 13 which is preferably, but not necessarily, provided with a reinforcing bottom plate 14 which forms a removable or renewable part of the bottom 13 of said trough 11. The bottom portions of the sloping walls 12 are also provided with renewable wear strips 15, 15 which take the wear occasioned by side sloping bearing surfaces of an endless chain and flight conveyer mechanism 16, as hereinafter described more completely.

It is, of course, obvious that the working run of the endless chain 16 will slide over the bottom 13 of the trough 11 and after it passes around a head sprocket 17 carried on a head shaft 18 which may be driven by any desired source of power, such as an electric motor, the return run of the chain 16 will be supported on a support and guide in the form of an inverted channel 19 which may be supported by the supporting frame 10, as disclosed in Fig. 2 of the drawing.

The chain and flight mechanism 16 is adapted to travel in the direction of the arrow 20 and convey logs longitudinally along the trough 11. It is to be noted that the bottom 13 of the trough 11 has a greater width than that disclosed in my patent above identified, and this is to insure that any logs delivered to the trough will come into contact with the endless chain and flight conveyer mechanism 16 and thus be properly conveyed therealong.

The endless chain and flight conveyer mechanism 16 includes alternate pivotally connected block links 21 and connecting links 22 which are pivotally connected by connecting pins 23. At desired intervals special connecting links 24 are provided.

Considering first the structure of the block links 21, these are formed preferably as a single casting with end barrels 25 which are flat on top to provide large bearing areas for the chain 16 during its return run. In addition, the integral side bars 26 of the block links 21 have flat bearing surfaces which lie in the same plane as the flat bearing surfaces of the barrels 25. The flat bearing surfaces of the barrels 25 have a width measured along a vertical plane which extends at right angles to the axis of their pin holes which receives the pins 23, which is substantially equal to the diameters of the barrels 25 and has a minimum width equal to the diameter of a connecting pin 23. This particular relation of parts is described and claimed in my Patent 2,286,666 above identified.

In addition, the bottom of each side bar 26 of block 21, when considered as moving in the upper run of the chain 16, is provided with a laterally outwardly extending wing, gib or flange 27, the bottom of which lies in the same plane as the bottom of the side bar 26 of which it is an integral part, thus appreciably increasing the area of the bearing surface of the block links 21 on the bottom plate 13—14 of trough 11. This, of course, increases the life of the block links 21.

The special connecting links 24 are formed by a pair of similar, though complementary, members, including side bars or straps 28 which are pivotally attached at their opposite ends to connecting block links 21 by appropriate pivot pins 23. The tops of the side bars 28 gradually slope upwardly from the rear toward the front, as viewed in their working run, and adjacent their forward ends where they are pivotally attached to the leading block link 21, are provided with laterally extending integral flights 29.

As clearly illustrated in Fig. 4 of the drawing, a connecting side bar and flight structure 28, 29 is formed as a substantial L-shaped integral structural member. The bottoms of the side bars 28 and the flights 29 of the special connecting links 24 preferably lie in a single plane which is also the plane of the bottom of the block links 21, considering the chain in its working run position, so that said bottoms of said connecting bars 28 and flights 29 provide flat bearing surfaces which slide over the bottom 13, 14 of the trough 11. This, of course, also aids in prolonging the life of the chain and conveyer mechanism 16.

The inner edge of the flights 29 has a height which is greater than that of the normal connecting link 22 and of the block link 21. This is also true of the forward portions of the connecting bars 28, so that said inner ends of flights 29 and forward portions of connecting bars 28 extend above the tops of the block links 21 during their upper run, as clearly illustrated in Fig. 2 of the drawing.

During the return run of the chain, the forward portions of the side bars 28 and the adjacent portions of the flights 29 extend downwardly on opposite sides of the supporting channel 19 and thus act as guides to maintain the chain 16 on the support 19 during its return run.

During its upper run the chain 16 is maintained substantially along the center of the trough 11 by virtue of the fact that the flights 29 are provided with sloping guiding bearing surfaces 30 on their bottoms, which bear against the wear strips 15.

In Fig. 2 of the drawing it may be noted that I have illustrated two slightly different forms of flights 29, those on the left-hand side of the chain coming to a sharp point at their extreme outer end, and those at the right-hand side being sheared to provide a stub end. The stub end type is also illustrated in Fig. 4 of the drawing. It is to be understood that either the sharp end or stub end type of flight 29 may be employed.

In the operation of the conveyer the endless chain and conveyer mechanism 16 will be moved with the upper run traveling in the direction of the arrow 20. Material, such as logs or any other material to be conveyed, is delivered to the trough 11 and comes in contact with the chain and flight conveyer mechanism 16 by which it is scraped along the trough 11 or supported on the chain and flight mechanism 16 and conveyed therealong. The width of the trough 11 is adequate to accommodate practically any log which is received, particularly in the paper-mill industry.

The chain and flight construction provides for a maximum of sliding bearing area between it and the bottom 13—14 of the trough 11, and ample bearing area is also provided for the return run of said chain 16. It is furthermore to be noted that the bottom plate 14 of the trough 11 can be renewed if it becomes worn, and the same is true of the wear strips 15. In fact, in some instances, instead of replacing the bottom plate 14, a new one may merely be put on top of it.

Obviously those skilled in the art may make various changes in the details and arrangment of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A conveyer chain for conveying logs and the like including interconnected block and connecting links forming an endless chain, certain of said block links having integral wings adapted to form bottom bearing surfaces for said links and certain of said connecting links including side bars, each side bar having spaced pin receiving openings therein, outwardly extending integral flights on some of said side bars, and pins pivotally connecting said side bars to said block links through said spaced openings, the top of each flight carrying side bar sloping upwardly and merging above the block links with the top of a flight, the top of a flight extending outwardly downwardly and the bottoms of said flights, side bars and block link wings lying in the same plane and forming bearing surfaces for the chain.

2. A conveyer chain for conveying logs and the like including interconnected block and connecting links forming an endless chain, certain of said connecting links including side bars, each side bar having spaced pin receiving openings therein, outwardly extending integral flights on some of said side bars, and pins pivotally connecting said side bars to said block links through said openings, the top of each flight carrying side bar sloping upwardly and merging above the block links with the top of a flight, the top of a flight extending outwardly downwardly and the bottoms of said flights, side bars and block links lying in the same plane and forming bearing surfaces for the chain.

ROBERT E. BRIGGS.